United States Patent Office 3,426,016
Patented Feb. 4, 1969

3,426,016
BASIC PHTHALOCYANINE DYESTUFFS
Hartmut Springer, Frankfurt am Main, and Edwin Baier, Hofheim, Taunus, Germany, assignors to Farbwerke Hoechst Aktiengesellschaft vormals Meister Lucius & Bruning, Frankfurt am Main, Germany, a corporation of Germany
No Drawing. Filed Oct. 1, 1963, Ser. No. 312,842
Claims priority, application Germany, Oct. 3, 1962, F 37,952
U.S. Cl. 260—239.6      7 Claims
Int. Cl. C07d 27/76; C09b 47/04

ABSTRACT OF THE DISCLOSURE

Phthalocyanine dyestuffs for dyeing cellulosic materials brilliant turquoise shades and capable of being fixed fast to washing, light and chlorine from an aqueous acid solution thereof by treatment with an alkali, such as sodium carbonate, sodium bicarbonate or the sodium salt of trichloroacetic acid.

---

The present invention relates to valuable basic phthalocyanine dyestuffs and to a process for preparing them; more particularly, it relates to basic phthalocyanine dyestuffs of the general formula

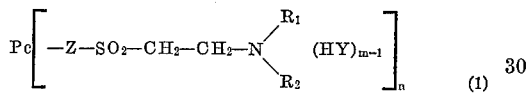

in which Pc represents a metalliferous or metal-free phthalocyanine radical which preferably does not contain anionic water-solubilizing groups, Z represents a direct linkage or a bivalent organic radical, Y represents the anion of an inorganic or organic acid, $n$ represents a number from 1 to 8, $m$ represents 1 or 2, and $R_1$ and $R_2$ represent aliphatic, cycloalkyl or aromatic radicals which may belong together with the nitrogen atom to a heterocyclic ring.

We have found that basic phthalocyanine dyestuffs of the general formula

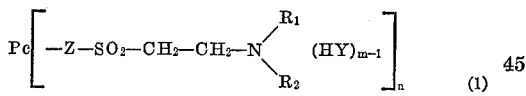

in which Pc represents a metalliferous or metal-free phthalocyanine radical which, preferably, does not contain anionic water-solubilizing groups, Z represents a direct linkage or a bivalent organic radical, Y represents the anion of an inorganic or organic acid, $n$ represents a number from 1 to 8, $m$ represents 1 or 2, and $R_1$ and $R_2$ represent hydrogen atoms or aliphatic, cycloalkyl or aromatic radicals which may be substituted, for example, by chlorine atoms, bromine atoms, methyl groups, ethyl groups, methoxy groups, ethoxy groups, acetyl groups, acetylamino groups, amino groups or hydroxy groups, or which, together with the nitrogen atom, may belong to a heterocyclic ring, can be prepared by reacting phthalocyanine derivatives of the formula $$Pc[—Z—SO_2—CH_2—CH_2—X]_n \qquad (2)$$

in which X represents a halogen atom or the acid radical of a polybasic inorganic acid or of an aromatic or aliphatic carboxylic acid or sulfonic acid, and Pc, Z and $n$ have the meanings defined above, with compounds of the formula

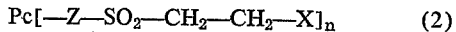

wherein $R_1$ and $R_2$ have the meanings given above and, if desired, treating in known manner the amines obtained with inorganic or organic acids.

The radical X may represent, in addition to a halogen atom, such, for example, as a chlorine atom or a bromine atom, also the radical of a polybasic mineral acid, for example, the radical of the sulfuric acid or of the phosphoric acid, or an organic acid radical, for example, the radical of the acetic acid or of p-toluene-sulfonic acid.

The phthalocyanine dyestuffs used as starting substances, which may once or several times contain the group of the formula $—SO_2—CH_2—CH_2—X$, are metal-free or metalliferous phthalocyanine derivatives in which the said groups are bound directly or over bivalent bridging members to the benzene nucleus of the phthalocyanine ring system.

As examples of a bivalent organic radical characterized by Z, there may be mentioned low alkylene groups such as groups of the formula $—CH_2—$ or $—CH_2—CH_2—$, arylene groups, such as a group of the formula

and furthermore the following groupings:

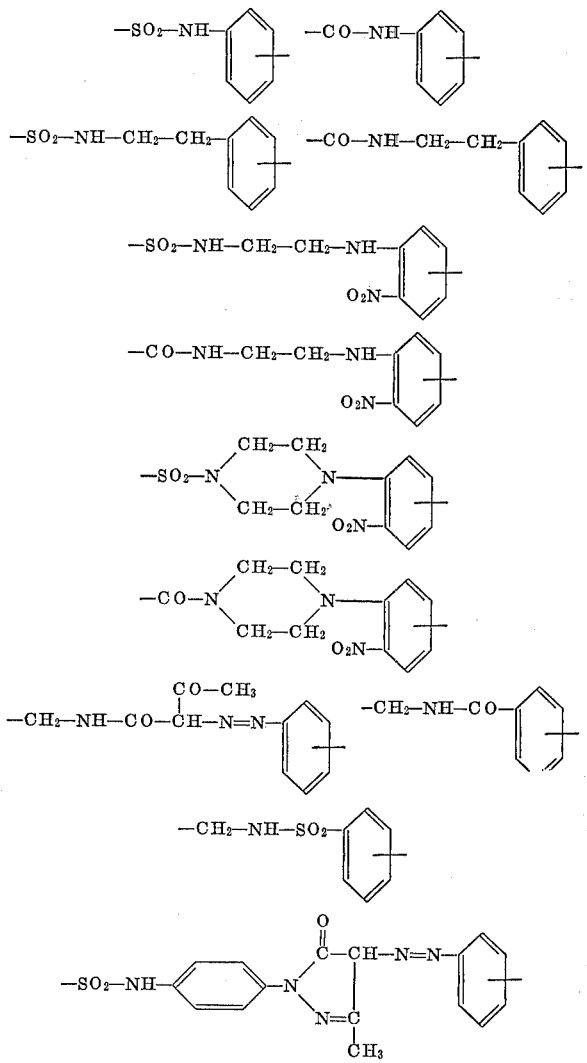

The starting dyestuffs of the present invention may carry further substituents at the benzene nuclei of the phthalocyanine ring system, for example, chlorine or bromine atoms, alkyl or aryl radicals, alkylmercapto, aminomethyl sulfonamide or benzoyl groups. Particularly valuable dyestuffs are obtained when using as starting compounds phthalocyanine dyestuffs of the indicated type which do not contain further anionic groups such, for example, as sulfonic acid or carboxylic acid groups, at any place of the molecule, except the substituent X which, if desired, may represent anionic groups.

The phthalocyanine dyestuffs used as starting compounds can be prepared by known methods. For example, by subjecting 4-($\beta$-hydroxyethyl)-sulfonyl-phthalic acid anhydride, either alone or together with phthalic acid anhydride, to a phthalocyanine melt and treating the compounds obtained with sulfuric acid, there are obtained phthalocyanine dyestuffs of the formula $$Pc[-SO_2-CH_2-CH_2-OSO_3H]_n$$

in which $n$ represents a number from 2 to 4, which are suitable as starting compounds. When the condensation products obtained are not treated with sulfuric acid but with thionyl chloride, there are obtained corresponding starting compounds in which the groups X represent chlorine atoms. The starting compounds of the present invention may also be obtained by condensing, for example, $\omega$-chloromethyl-phthalocyanine, phthalocyanine - sulfonic acid halides or phthalocyanine-carboxylic acid halides with aliphatic or aromatic bases containing the grouping $-SO_2-CH_2-CH_2-X$. Furthermore, suitable starting compounds of the formula $$Pc[-CH_2-SO_2-CH_2-CH_2-OCOCH_3]_n$$

in which $n$ represents a number from 2 to 4, can be prepared, for example, by replacing in known manner the chlorine atoms in $\omega$-chloromethyl-phthalocyanine by mercapto groups, reacting the compounds obtained with ethylene oxide or $\beta$-chloroethyl alcohol, acetylating and oxidizing the thio-ether groups to form sulfonic groups. Furthermore, phthalocyanine derivatives capable of coupling may be condensed with diazotized aromatic amines which contain at least once the group $-SO_2-CH_2-CH_2-X$. Finally, it is also possible to react phthalocyanine compounds which contain primary or secondary amino groups, for example, tetrakisaminomethyl-copper-phthalocyanine compounds, with aliphatic or aromatic carboxylic acid halides or sulfonic acid halides which contain at least once the grouping $-SO_2-CH_2-CH_2-X$.

Compounds of the Formula 3 suitable for the reaction with the phthalocyanine derivatives of the Formula 2 are ammonia and primary amines, for example, methylamine, ethylamine, propylamine, isopropylamine, butylamine, hexylamine, benzylamine, and aniline, and especially secondary amines, for example, dimethylamine, diethylamine, diethanolamine, morpholine, piperidine, N-methylbenzylamine, pyrolidine, N-methyl- or N-ethylanine dicyclohexylamine and N-methylcyclohexylamine.

The process is carried out advantageously by reacting a phthalocyanine derivative of the Formula 2 with a compound of the Formula 3 in an aqueous or non aqueous medium in the presence of agents having an alkaline reaction. Depending on the solubility, the reaction may be carried out in solution or suspension, in the last mentioned case with the addition of a dispersing agent and while stirring and kneading in order to obtain a homogenous reaction mixture favourable for the reaction. For carrying out the reaction in a nonaqueous medium, there may be used inert organic liquids, for example, acetone, benzene or nitrobenzene. An amine of the Formula 3 may also serve as a solvent, provided it is liquid at the reaction temperature.

As agents having an alkaline reaction, there are used when working in aqueous medium preferably water-soluble inorganic acid-binding agents such, for example, as sodium carbonate or sodium hydroxide, and when working in a nonaqueous medium tertiary organic bases such, for example, as pyridine or triethylamine. In both modifications of the process however, the amine of the Formula 3 serving as a reactant is preferably used as agent having an alkaline reaction. Since in the reaction according to the last-mentioned modification of the process one molecule HX is first separated from each grouping $$-SO_2-CH_2-CH_2-X$$

by the action of the agent having an alkaline reaction and the vinylsulfonic group formed intermediarily then adds one molecule of the amine of the Formula 3, the molecular ratio of amine to phthalocyanine derivative must be at least $2n:1$; preferably, however, an excess is used, $n$ having the meaning given above and reflecting the number of $-SO_2-CH_2-CH_2-X$ groupings contained in the phthalocyanine derivative used as the starting substance.

The reaction of the mentioned phthalocyanine derivatives with the indicated amines can be carried out within a large temperature range, namely between about 10° and 200° C. However, the temperature range to be used in each particular case depends, on the one hand, largely on the phthalocyanine derivative used as the starting substance and on the other hand, on the amine used, it being also possible that the reaction medium used may also have an influence.

Thus, for example, when aliphatic or cyclic amines are used, the optimum temperature range is often between about 40 and 80° C., whereas when heterocyclic or aromatic amines are reacted, it is often advantageous to use higher temperatures, for example, temperatures in the range of about 70° and 120° C. If higher temperatures are used, it is often advantageous, with regard to the volatility of the amine used, to operate in an autoclave under pressure.

The basic phthalocyanine dyestuffs of the Formula 1 first obtained in the process of the invention, which generally are insoluble in water but well soluble in dilute acids can be converted in known manner with inorganic acids, for example, hydrochloric acid, hydrobromic acid or sulfuric acid, or organic acids, for example, formic acid or acetic acid, into the corresponding ammonium compounds. For this purpose the water-insoluble basic dyestuffs obtained are dissolved in water by the addition of acids, for example, hydrochloric acid, whereupon the dyestuff salts are recovered from the solution by salting out.

The phthalocyanine dyestuffs of the Formula 1 are obtained in good yield. The conversion of these amines into the corresponding ammonium compounds is carried out with a yield of 90 to 100% of the theory.

The novel phthalocyanine dyestuffs obtained by the process of the present invention are excellently suitable for dyeing and printing cellulose materials and possess, in form of their water-soluble salts a remarkable affinity for textile fibres from natural or regenerated cellulose; for example, from acid aqueous solutions they very well dye cotton fabrics. The specific value of the compounds of this invention is that they can be fixed fast to washing by an alkaline treatment with agents binding acid, for example sodium carbonate, sodium bicarbonate or the sodium salt of trichloroacetic acid. The brilliant turquoise dyeings and prints obtained are distinguished by very good fastness properties, particularly by very good properties of wet fastness, to light and to chlorine.

The compounds obtainable by the process of the present invention have the advantage over the dyestuffs of the Formula 2 used as starting compounds that they dye cellulosic materials from aqueous dyebaths without the addition of salt. In contradistinction thereto, the starting dyestuffs dye cellulose materials from aqueous baths only very poorly and the fabric is dyed weakly only, even if large amounts of salts are added. A further advantage of the novel dyestuffs is that in pad dyeing with intermediate drying they do not tend or almost do not tend to migrate and that they yield level dyeings with good penetration of the dye. The dyestuffs of the invention have the same advantages over dyestuffs having similar constitution and which contain one or several sulfonic acid groups.

The following Examples illustrate the invention, but they are not intended to limit it thereto, the parts being by weight unless otherwise stated and the relationship of parts by weight to parts by volume being the same as that of the kilogram to the liter.

Example 1

7.3 parts of diethylamine are slowly added at about 50° C. to a solution of 21.5 parts of the dyestuff of the formula

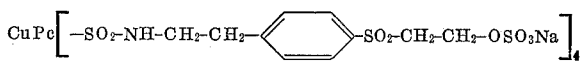

in 500 parts of water and the mixture is stirred for 1 hour at about 50 to 60° C. The mixture is allowed to cool, the separated dyestuff is filtered off and the filter cake is washed with water until neutral. The dyestuff obtained has the formula

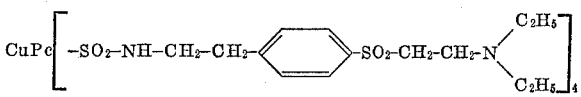

For conversion into the water-soluble hydrochloride, the wet filter cake is suspended in 500 parts of water, 20 parts of 2 N-hydrochloric acid are added and the whole is heated to about 70–80° C. The solution thus formed is clarified and the dyestuff hydrochloride is separated by salting out with sodium chloride. 30.5 parts of the salt-containing dyestuff hydrochloride are obtained which dissolves in water to give a turquoise blue solution. When cotton is dyed with this dyestuff from an acetic solution and the dyeing obtained is subjected to an alkyline after-treatment, a turquoise blue dyeing having very good wet fastness properties is obtained.

Instead of the dyestuff hydrochloride, the corresponding actic acid salt can be isolated by treating in analogous manner the first obtained basic dyestuff with dilute acetic acid.

Dyestuffs having similar properties are obtained when using instead of diethylamine equimolar quantities of dimethylamine or piperidine.

Example 2

16.7 parts of the dyestuff of the formula

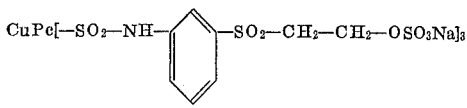

are dissolved in 500 parts of water, 7.3 g. of diethylamine are added dropwise to the solution at about 50° C., and the solution is then stirred for 1 hour at about 50–60° C. The whole is allowed to cool to room temperature, the reaction mixture is rendered neutral by means of hydrochloric acid, the separated dyestuff is filtered off and the filter cake is washed with water. The dyestuff thus obtained has the formula

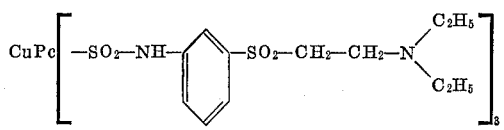

It can be converted into its water-soluble hydrochloride by suspending the wet filter cake in 1000 parts of water and dissolving it at about 50–60° C. by adding 15 parts of 2 N-hydrochloric acid. The solution is clarified and the hydrochloride of the dyestuff is salted out by means of sodium chloride. After drying, there are obtained 22 parts of the salt-containing hydrochloride which is soluble in water while giving a turquoise blue solution. Under the action of agents having an alkaline reaction, the dyestuff can be firmly fixed on cotton or staple fibers in giving brilliant turquoise blue dyeings and prints which possess very good fastness to washing and to light.

Dyestuffs having similar properties are obtained when using instead of the copper-phthalocyanine dyestuffs the same derivative of nickel-phthalocyanine or of the metal-free phthalocyanine, in the case of the nickel-phthalocyanine a dyestuff having a somewhat more greenish shade being obtained.

Example 3

14.2 parts of the phthalocyanine dyestuff of the formula

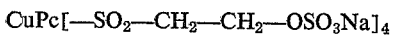

are dissolved in about 1000 parts of water, the solution is heated to about 50° C. and 7.3 parts of diethylamine are dropwise added at this temperature. The reaction mixture is then heated for 1 hour to the boil and, after cooling, the dyestuff that has separated is filtered off and then washed with water until neutral. The dyestuff can be converted in the manner indicated above into the hydrochloride and can be isolated as dyestuff hydrochloride. 15 parts of a salt-containing compound of the formula

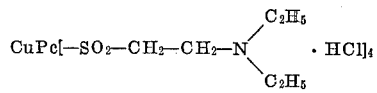

are obtained. The compound dissolves in water to give a turquoise blue solution and dyes cellulose materials fast to washing turquoise blue shades.

By replacing the copper-phthalocyanine by the equivalent quantity of the corresponding cobalt-phthalocyanine derivative, a reddish blue dyestuff which gives dyeings and prints on cellulose materials that have good properties of fastness, is obtained.

Example 4

24 parts of the dyestuff of the formula

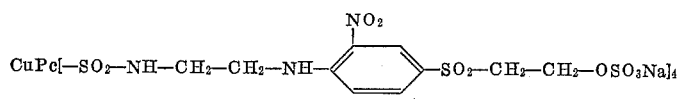

are dissolved, while heating, in 400 parts of water. 7.3 parts of diethylamine are introduced dropwise into the solution obtained, and the mixture is then stirred for 1 hour at about 50 to 60° C. The mixture is allowed to cool to room temperature, the separated dyestuff is filtered off and the filter cake is washed with water until neutral. The dyestuff is then converted in the manner described above into the hydrochloride of the formula

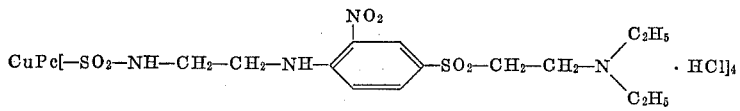

35 parts of the salt-containing dyestuff hydrochloride are obtained which dissolves in water to give a bluish green solution. When dyeing cotton fabric with this dyestuff from an aqueous or, if desired, weakly acetic solution and subjecting the dyed material to an alkaline after-treatment, bluish green dyeings possessing very good properties of fastness are obtained.

A dyestuff having similar properties is obtained when reacting the phthalocyanine dyestuff of the formula

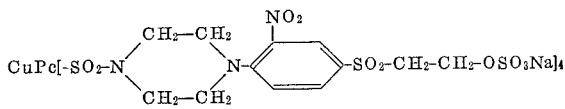

with diethylamine and converting into the hydrochloride.

then stirred for 1 hour at about 100° C. The reaction mixture is allowed to cool to room temperature and about 200 parts of water are added, while stirring. The separated dyestuff is filtered off, washed with water until neutral and converted in the usual manner into the dyestuff hydrochloride.

9.5 parts of salt-containing dyestuff hydrochloride of the formula

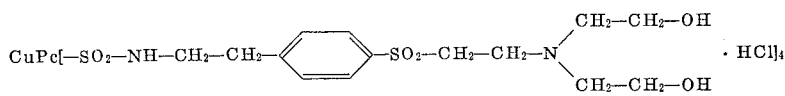

Example 5

26 parts of the dyestuff of the formula

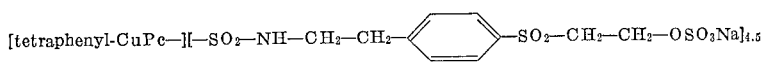

are dissolved in about 1500 parts of water. The solution is heated to about 50° C. and 8.0 parts of diethylamine are added dropwise. The reaction mixture is then further treated as described in Example 1 and the dyestuff that has formed is isolated in the form of the hydrochloride. There are obtained 18.5 parts of the salt-containing dyestuff hydrochloride which dissolves in water to give a green solution and can be used for the dyeing of cellulose materials.

The dyestuff of the above formula used as the starting substance can be obtained as follows: tetraphenyl-copperphthalocyanine is converted by the reaction with chlorosulfonic acid and thionyl chloride into tetraphenyl-copperphthalocyanine sulfochloride containing on the average 4.5 sulfochloride groups in the molecule. This sulfochloride is then condensed with β-hydroxyethyl-[4-(β-aminomethyl)phenyl]-sulfone of the formula

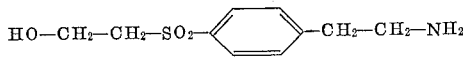

whereupon the sulfonamide formed is converted by means of sulfuric acid into the acid sulfuric acid ester, the latter is converted into the neutral sodium salt and the sodium salt is isolated.

Example 6

20 parts of the phthalocyanine dyestuff of the formula

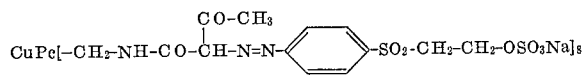

are dissolved in 500 parts of water and reacted in the manner described in Example 1 with 7.3 parts of diethylamine. The basic dyestuff formed is isolated in the form of the hydrochloride. 30 parts of the salt-containing dyestuff hydrochloride are obtained which dissolves in water to give a green solution and which gives on cotton tissues dyeings having blue green shades and good properties of fastness.

Example 7

14.7 parts of the dyestuff of the formula $$CuPc[-CH_2-SO_2-CH_2-CH_2-OSO_3Na]_4$$

are reacted according to the process described in Example 3 with 4.5 parts of dimethylamine and the basic dyestuff obtained in a good yield is converted into the hydrochloride. The hydrochloride is well soluble in water and gives under the dyeing conditions indicated in Example 1 turquoise blue dyeings and prints on cellulose materials with very good properties of fastness.

Example 8

10.8 parts of the dyestuff used in Example 1 as starting compound are introduced slowly, while well stirring, into 20 parts of diethanolamine and the reaction mixture is are obtained which is well soluble in water. When dyeing with the dyestuff obtained cellulose materials, for example, cotton fabrics, from acetic solutions and subjecting the dyeing obtained to an alkaline after treatment, there are obtained turquoise blue dyeings having very good properties of wet fastness.

Dyestuffs that have practically the same properties are obtained when using instead of diethanolamine equivalent amounts of N-methylaniline or dicyclohexylamine.

Example 9

14.2 parts of the dyestuff of the formula

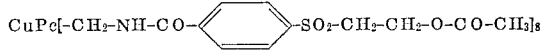

obtainable by the reaction of octakisaminomethyl-copperphthalocyanine with 4-[(β-acetoxy-ethyl)-sulfonyl]-benzoyl chloride are stirred in 50 parts of diethylamine for 2 hours at about 50° C. After the reaction mixture has cooled to room temperature, the dyestuff obtained is filtered off and washed with ethanol until it is free from diethylamine. The filter residue is thereupon suspended in about 1000 parts of water and is dissolved by the addition of 20 parts of 2 N-hydrochloric acid. After the solution has been clarified, the dyestuff hydrochloride is separated by salting out with common salt. After isolation and drying, 21.3 parts of salt-containing dyestuff hydrochloride of the formula

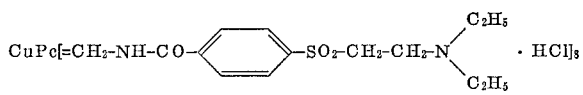

are obtained. The dyestuffs yields on cotton fabrics, when dyed from an aqueous or weakly acetic solution and after an alkaline after-treatment, green blue dyeings having good properties of wet fastness.

The same dyestuff is obtained when reacting an equivalent amount of the dyestuff of the formula

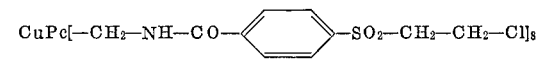

obtainable by the reaction of octakisaminomethyl-copperphthalocyanine with 4-[(β-chloroethyl)-sulfonyl]-benzoyl chloride in the manner described above with diethylamine and treating the basic dyestuff first obtained with hydrochloric acid.

We claim:

1. The compound of the formula

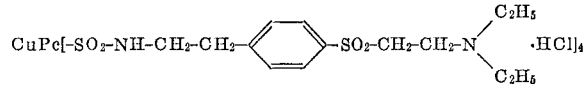

2. The compound of the formula

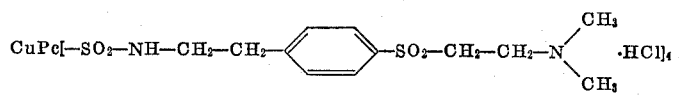

3. The compound of the formula

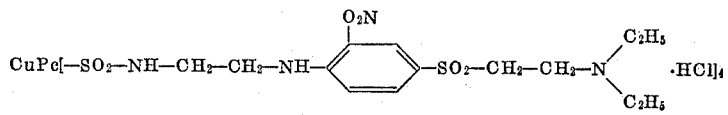

4. The compound of the formula

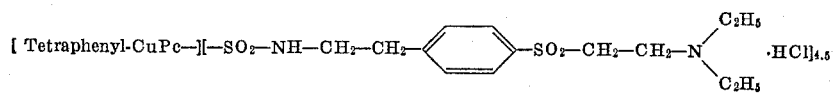

5. The compound of the formula

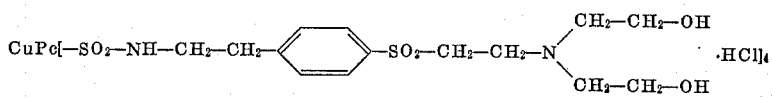

6. The compound of the formula

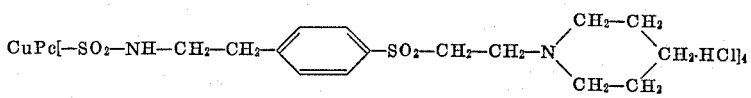

7. A compound of the formula

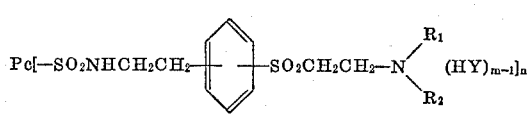

wherein Pc is copper-pthalocyanine, nickel-phthalocyanine, cobalt-phthalocyanine, tetraphenyl-copper-phthalocyanine or metal-free phthalocyanine, Y is a chlorine or acetate ion, $n$ is 3 to 8, $m$ is 1 or 2, $R_1$ and $R_2$ individually represent lower alkyl, hydroxy lower alkyl, cycloalkyl or phenyl, and $R_1$ and $R_2$ together represent lower alkylene.

References Cited

UNITED STATES PATENTS 3,148,933   9/1964   Randall et al. _____ 260—314.5

FOREIGN PATENTS 927,404   5/1963   Great Britain.

JOHN D. RANDOLPH, *Primary Examiner.*

U.S. Cl. X.R.

260—293.4, 314.5, 268, 146; 8—54.2, 41, 62